United States Patent
Goel et al.

(10) Patent No.: US 10,318,400 B2
(45) Date of Patent: Jun. 11, 2019

(54) METHODS OF SOFTWARE PERFORMANCE EVALUATION BY RUN-TIME ASSEMBLY CODE EXECUTION AND DEVICES THEREOF

(71) Applicant: Infosys Limited, Bangalore (IN)

(72) Inventors: Gagan Mohan Goel, Faridkot (IN); Rajeshwari Ganesan, Bangalore (IN); Geetika Goel, Bangalore (IN); Deepjot Singh, Chandigarh (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/612,708

(22) Filed: Feb. 3, 2015

(65) Prior Publication Data

US 2015/0227448 A1 Aug. 13, 2015

(30) Foreign Application Priority Data

Feb. 13, 2014 (IN) .............................. 680/CHE/2014

(51) Int. Cl.
*G06F 8/41* (2018.01)
*G06F 11/34* (2006.01)
*G06F 11/36* (2006.01)

(52) U.S. Cl.
CPC ........ *G06F 11/3466* (2013.01); *G06F 8/4436* (2013.01); *G06F 11/3409* (2013.01); *G06F 11/3612* (2013.01)

(58) Field of Classification Search
CPC .... G06F 8/44–8/52; G06F 8/54; G06F 8/751; G06F 11/30; G06F 11/302;

(Continued)

(56) References Cited

U.S. PATENT DOCUMENTS 5,047,919 A * 9/1991 Sterling .............. G06F 11/3612
714/47.3
5,265,254 A * 11/1993 Blasciak ............. G06F 11/3466
713/502

(Continued)

OTHER PUBLICATIONS

Anonymous, "Control Flow" Mathworks [online], 2012 [retrieved Sep. 8, 2015], Retreived from Internet: <URL: https://web.archive.org/web/20121104072804/http://www.mathworks.com/help/matlab/learn_matlab/flow-control.html?>, pp. 1-6.*

(Continued)

*Primary Examiner* — Todd Aguilera
(74) *Attorney, Agent, or Firm* — Pepper Hamilton LLP

(57) ABSTRACT

A system and method for evaluating performance of a software application. The present invention includes analyzing by one or more computing devices a plurality of program code lines of the software application stored in one or more computer databases. Further, one or more equivalent program regions within the plurality of program code lines may be identified. One or more markers in the identified one or more equivalent program regions may be inserted and stored in the one or more computer databases. Further, the plurality of program code lines may be compiled and assembled respectively to generate an executable code. The executable code may include a plurality of instructions. Further, performance metrics of the software application may be measured by manipulating the plurality of instructions based on the one or more equivalent program regions identified by the inserted one or more markers and executing the executable code.

18 Claims, 6 Drawing Sheets

(58) Field of Classification Search
CPC ......................... G06F 11/3058–11/3096; G06F 11/34–11/3495; G06F 11/36–11/3664; G06F 9/44536; G06F 9/44557
USPC .................................................. 717/127–161
See application file for complete search history.

(56) References Cited

U.S. PATENT DOCUMENTS

| | | | |
|---|---|---|---|
| 5,530,964 A | 6/1996 | Alpert et al. | |
| 6,006,033 A * | 12/1999 | Heisch | G06F 8/445 |
| | | | 711/125 |
| 6,282,707 B1 * | 8/2001 | Isozaki | G06F 8/443 |
| | | | 717/157 |
| 6,345,384 B1 | 2/2002 | Sato | |
| 6,922,829 B2 * | 7/2005 | Ward | G06F 8/4441 |
| | | | 717/130 |
| 6,970,805 B1 | 11/2005 | Bierma et al. | |
| 7,020,905 B2 | 4/2006 | Chiang | |
| 7,203,936 B2 | 4/2007 | Gillies et al. | |
| 7,373,550 B2 | 5/2008 | Brawn et al. | |
| 7,657,881 B2 * | 2/2010 | Nagendra | G06F 9/45516 |
| | | | 717/136 |
| 7,908,593 B2 * | 3/2011 | Arnold | G06F 11/3688 |
| | | | 717/131 |
| 7,954,095 B2 * | 5/2011 | Archer | G06F 11/3495 |
| | | | 709/201 |
| 8,225,284 B2 * | 7/2012 | Larsen | G06F 11/3684 |
| | | | 717/100 |
| 2001/0032332 A1 * | 10/2001 | Ward | G06F 8/4441 |
| | | | 717/160 |
| 2002/0184615 A1 * | 12/2002 | Sumner | G06F 8/427 |
| | | | 717/130 |
| 2005/0114736 A1 * | 5/2005 | Larsen | G06F 11/3684 |
| | | | 714/38.13 |
| 2006/0129997 A1 * | 6/2006 | Stichnoth | G06F 9/445 |
| | | | 717/127 |
| 2006/0136712 A1 * | 6/2006 | Nagendra | G06F 9/45516 |
| | | | 713/150 |
| 2008/0101232 A1 * | 5/2008 | Archer | G06F 11/3495 |
| | | | 370/235 |
| 2008/0168433 A1 * | 7/2008 | Arnold | G06F 11/3688 |
| | | | 717/158 |

OTHER PUBLICATIONS

Anonymous, "assemble", IEEE 100: The Authoritative Dictionary of IEEE Standards Terms, IEEE, 7$^{th}$ Ed., 2000, pp. 54-55.*

Pettis, K., et al., Profile Guided Code Positioning, Proceedings of the ACM SIGPLAN '90 Conf. on Programming Language Design and Implementation [online], 1990 [retrieved Apr. 24, 2017], Retrieved from Internet: <URL: http://perso.ensta-paristech.fr/~bmonsuez/Cours/B6-4/Articles/papers15.pdf>, pp. 16-27.*

* cited by examiner

```
sequencer TargetProgram.o addrD=0x08048daf addrS=0x08048db4
0x08048d9e <+400>:   call   0x80484d4 <puts@plt>
0x08048da3 <+405>:   movl   $0x8049050,(%esp)
0x08048daa <+412>:   call   0x80484d4 <puts@plt>
0x08048daf <+417>:   call   0x80488a2 <Function2>
0x08048db4 <+422>:   call   0x8048686 <Function1>
0x08048db9 <+427>:   call   0x8048794 <Function3>
0x08048dc3 <+437>:   movl   $0x8049070,(%esp)
0x08048dca <+444>:   call   0x80484d4 <puts@plt>
```

FIG. 4

| Sequence of Instructions | Total Execution Time | % Processor Time | | | Received Bytes/Sec | | | Memory Used MBs | | |
|---|---|---|---|---|---|---|---|---|---|---|
| | | Min | Max | Avg | Min | Max | Avg | Min | Max | Avg |
| 2-1-3 | 5 minutes and 23 seconds | 0.18 | 35.9 | 10.3 | 0 | 139995.8 | 127306.6 | 1990 | 2100 | 2023 |

FIG. 5

METHODS OF SOFTWARE PERFORMANCE EVALUATION BY RUN-TIME ASSEMBLY CODE EXECUTION AND DEVICES THEREOF

This application claims the benefit of Indian Patent Application Serial No. 680/CHE/2014 filed Feb. 13, 2014, which is hereby incorporated by reference in its entirety.

FIELD

This disclosure relates generally to the technical field of software performance evaluation and, more specifically to a method and/or a system for evaluating performance of a software application through run-time assembly code execution.

BACKGROUND

Popularity of cloud deployments has brought forth several challenges. One of the challenges being performance of a software application under different operational workloads. Cloud computing environments, for example Software as a Service (SaaS) may have multiple customers using a common service. Each customer should potentially have unique workload characteristics.

An underlying service may use a set of software programs and/or an architecture for a typical deployment and/or a specific workload. Any variance from the unique workload characteristics shall deteriorate the performance of the software application resulting in service level agreement violations. Often performance enhancements may have been brought by making changes to a source code, an architecture and/or a hardware capacity of the system.

There may have several performance evaluation techniques based on a software development lifecycle. The performance evaluation techniques may include code profiling, stress tests and/or capacity management.

Mutation testing has been used extensively to verify correctness of a software functionality and/or a test suite to be used to test the software application. The source code and/or an assembly code may be changed to mutate the source code and/or the assembly code. The mutated code may semantically be different from the original source code. The mutated code when run may expect to throw an exception, and/or show incorrect results at a point where the mutated code may have been introduced.

Absence of the exception and/or the incorrect results may prove that a part of the source code of the software application may be redundant and/or the test suite may be inadequate. Thus, may not cover the mutated part of the source code. In other words, the mutation testing may be considered as a means to verify completeness and/or correctness of the test suite.

Software Implemented Fault-injections (SWIFI) may relate to injecting faults in the source code and/or into a memory address of the software application just before execution. The SWIFI techniques may be used to test either fault tolerance of the system, and/or study failure modes. The SWIFI may operate with the assembly code, where at run-time various instructions and/or data may be manipulated to change randomly and/or in a pre-defined location. Such a manipulation may be a single bit and/or a multi bit flip.

The source code of a software application written in high level languages such as COBOL, C, C++, JAVA may have become prevalent. There may have been various consequences of providing the source code for testing the software application. Intellectual property (IP) risk may have been main concern in organizations. There may have the source code changes during the testing of the software application. Bugs may also be added during the testing of the software application.

SUMMARY

Software performance evaluation by run-time assembly code execution is disclosed. In one aspect, a method includes evaluating performance of a software application in a data processing system. A plurality of program code lines of the software application stored in one or more computer databases are analyzed by one or more computing devices. The one or more computing devices access the one or more computer databases through a computer network. One or more equivalent program regions within the plurality of program code lines are identified. One or more markers in the identified one or more equivalent program regions are inserted. The one or more markers are stored in the one or more computer databases. The plurality of program code lines are compiled and assembled by a compiler and an assembler respectively to generate an executable code. The executable code includes a plurality of instructions. Performance metrics of the software application is measured recurrently by manipulating the plurality of instructions based on the one or more equivalent program regions identified by the inserted one or more markers and executing the executable code.

The one or more equivalent program regions may include one or more nested control flow statements and loop statements. The executable code may include at least one of an assembly code and a byte code. The executable code may be executed by subjecting the executable code to one or more workloads stored in the one or more computer databases. The plurality of instructions may be manipulated by changing at least one of a sequence and one or more values of the plurality of instructions based on the one or more equivalent program regions. An optimal sequence of the plurality of instructions in the executable code may be determined. The optimal sequence may be stored in the one or more computer databases.

In another aspect, a system for evaluating performance of a software application is disclosed. The system includes one or more computer databases, associated through a computer network. The system further includes one or more computing devices, associated through the one or more computer databases. The one or more computing devices analyzes a plurality of program code lines of the software application stored in the one or more computer database, identifies one or more equivalent program regions within the plurality of program code lines. The one or more computing devices further inserts one or more markers in the identified one or more equivalent program regions and stores the one or more markers in the one or more computer databases. The plurality of program code lines are compiled and assembled by a compiler and an assembler respectively to generate an executable assembly code. The executable code includes a plurality of instructions. A performance measuring unit associated through the one or more computing devices measures performance metrics of the software application by manipulating the plurality of instructions based on the one or more equivalent program regions identified by the inserted one or more markers and executing the executable code.

In a further aspect a computer program product comprising a non-transitory computer usable medium having a computer readable program code embodied therein for evaluating performance of a software application in a data processing system. The computer program product includes analyzing by one or more computing devices a plurality of program code lines of the software application stored in a one or more computer databases. The one or more computing devices access the one or more computer databases through a computer network. One or more equivalent program regions within the plurality of program code lines are identified. One or more markers in the identified one or more equivalent program regions are inserted. The one or more markers are stored in the one or more computer databases. The plurality of program code lines are compiled and assembled by a compiler and an assembler respectively to generate an executable code. The executable code includes a plurality of instructions. Performance metrics of the software application is measured by manipulating the plurality of instructions based on the one or more equivalent program regions identified by the inserted one or more markers and executing the executable code.

The methods, systems, and apparatuses disclosed herein may be implemented in any means for achieving various aspects, and may be executed in a form of a machine/readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 illustrates changing a sequence of a plurality of instructions in the assembly code based on the equivalent program regions shown in FIG. 3, according to one embodiment.

FIG. 5 illustrates performance metrics of the software application described in FIG. 3, according to one embodiment.

Other features of the present embodiments will be apparent from the accompanying drawings and from the detailed description that follows.

DETAILED DESCRIPTION

Software application performance evaluation by run-time assembly code execution method and system is disclosed. In the following description, for the purposes of explanation, numerous specific details are set forth in order to provide a thorough understanding of the various embodiments. It will be evident, however to one skilled in the art that the various embodiments may be practiced without these specific details.

In various embodiments of the present invention, performance of a software application may be evaluated with a set of equivalent program regions. Each equivalent program region may have the same functional and/or semantic behavior but may differ in a performance outcome of the software application. The performance difference emerging from the set of equivalent program regions may form a basis for determining the optimal solution for the software application under a specific workload.

The equivalent program regions may be executed in an automated and intelligent manner. The executions may happen without any changes in a source code of the software application. There are several factors involving access to the source code of the software application. For example, the source code may not be available, the source code reading may not be permissible due to intellectual property issues, changing the source code to perform changes may result in inadvertent bugs to be introduced in the source code. Thus, an assembly level code changes may be performed for determining the performance of the software application.

In other embodiments of the present invention, performance evaluation of the software application may happen by executing the specific workload and measuring of a set of performance metrics. The set of performance metrics being an application response time, an application throughput and/or a system resource utilization. The set of performance metrics may reflect the performance of the software application for the specific operational workload. With changes to the workload and/or an operating environment (hardware and/or software) the performance of the software application may change.

Figure 1:
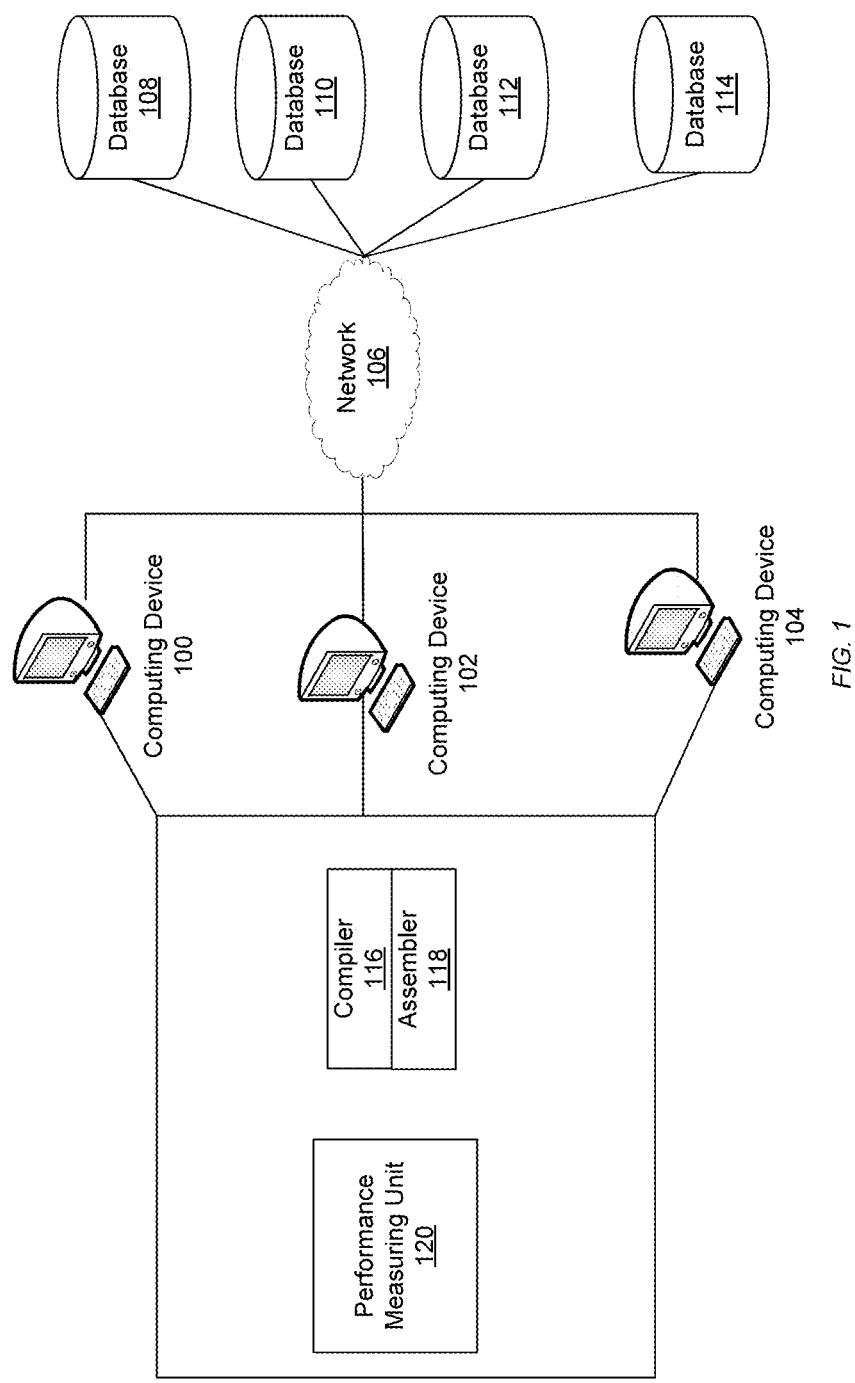
FIG. 1 illustrates an architectural block diagram of a system for facilitating software performance evaluation, according to one embodiment.

FIG. 1 illustrates an architectural block diagram of a system for facilitating software performance evaluation, according to one embodiment. As shown in FIG. 1, computing devices 100, 102, 104 may be connected to computer databases 108, 110, 112, 114 through a computer network 106. The one or more computer databases 108, 110, 112, 114 may store program code lines of a software application. The program code lines may be in programming languages such as C, C++, COBOL, JAVA, Visual C, PHP, XML and/or Pascal. One or more computing devices 100, 102, 104 may access the program code lines of the software application stored in the one or more computer databases 108, 110, 112, 114. The program code lines may be analyzed by the one or more computing devices 100, 102, 104 and one or more equivalent program regions within the plurality of program code lines may be identified. An identification of the one or more equivalent program regions may be done based on knowledge of functionality and/or architecture of the software application.

Markers may be defined in the program code lines to mark the identified one or more equivalent program regions for automatic identification during run-time. The markers may provide very exact feedback from known points in the software application. Values and/or properties associated with the markers may create a marker property. The marker property may form run-time conditions for the markers. The markers may be stored in one or more computer databases 108, 110, 112, 114.

The marker property may be for example, a toggle between 'process per connection' and/or 'shared connection'. A polling frequency of the software application may also be set by the marker. In case of polling time being too frequent, resources may be wasted, and in case the polling time being too long the performance may be degraded. To overcome subjectivity of "too frequent" or "too long", the markers may be inserted objectively and/or quantitatively to set arrival rate correctly. The markers may also be inserted in case statements. The markers may be inserted even in multiple independent filters. Interchanging data of the filters may not impact the program code lines of the software application semantically, but may impact the performance.

In accordance with an example embodiment of the present invention, the program code lines may be in any of a variety of programming languages such as C, C++, COBOL, JAVA, Visual C, PHP, XML and/or Pascal, the marker property may be programming language-independent. Thus, the marker property may be same for two programming languages with different syntax.

The program code lines may be compiled and assembled by a compiler 116 and an assembler 118 respectively to generate an executable code. The executable code may have a plurality of instructions. The executable code may include an assembly code and/or a byte code. The markers may be easily identified in the executable code. The one or more equivalent program regions may be identified in the executable code based on the inserted markers. Performance metrics of the software application may be measured through a performance measuring unit 120 by repeating a process of manipulating the plurality of instructions based on the one or more equivalent program regions identified by the inserted one or more markers and executing the executable code. The performance metrics may be stored in the one or more computer databases 108, 110, 112, 114.

Figure 2:
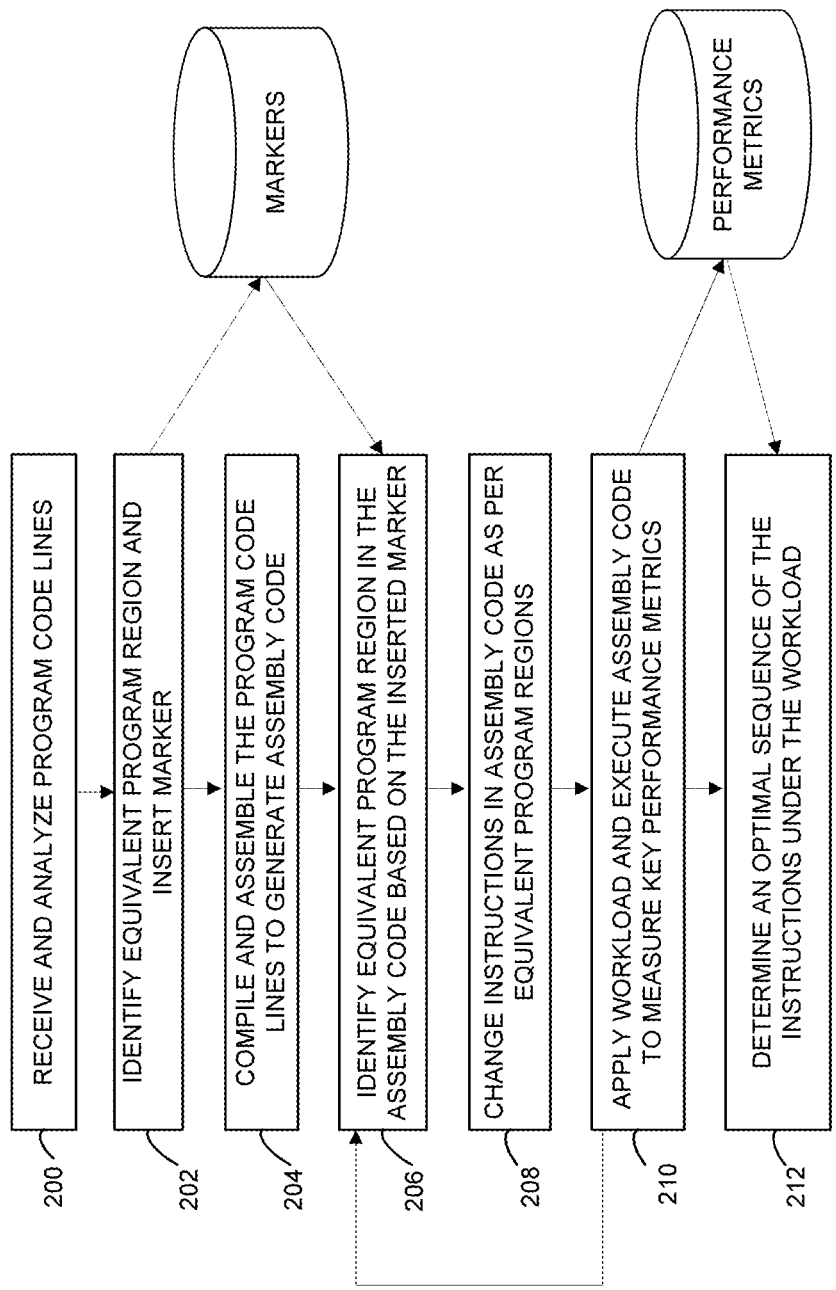
FIG. 2 illustrates a process flow for a method to evaluate performance of a software application by run-time assembly code execution, according to one embodiment.

FIG. 2 illustrates a process flow for a method to evaluate performance of a software application by run-time assembly code execution, according to one embodiment. At operation 200, the program code lines of the software application may be received and analyzed. At operation 202, the equivalent program regions within the program code lines may be identified and the markers may be inserted. At operation 204, the program code lines may be compiled and assembled respectively to generate the assembly code. At operation 206, the equivalent program regions may be identified based on the inserted markers. At operation 208, the plurality of instructions in the assembly code may be changed based on the equivalent program regions. At operation 210, one or more workload may be applied to the assembly code. The assembly code may be executed. The performance metrics of the software application may be measured.

A combination of one or more workloads may be applied at operation 210 and the operations 206, 208 and 210 may be repeated to obtain various performance metrics of the software application. The operations 206, 208 and 210 may be optimized based on various algorithms. For example, the performance metrics of the software application may be measured by only executing the plurality of instructions corresponding to the equivalent program regions with an immediate boundary of the plurality of instructions.

The various performance metrics may be stored in the one or more computer databases 108, 110, 112, 114. At operation 212, an optimal sequence of the plurality of instructions under a specific workload may be determined based on the various performance metrics. An accurate estimation of performance of the software application may be achieved, as the estimation may rely on the execution of the assembly code.

For example, during a testing phase of the software application, the equivalent program regions may be identified in the assembly code based on the markers. The sequence of the instructions may be changed in the assembly code. The software application may be subjected to different workloads. The various performance metrics of the software application shall be measured by testing the software application with the different sequences of instructions in the assembly code under the different workloads. The optimal sequence of the instructions in the executable code may be determined. Thus, best performance under a specific sequence of instructions and a particular workload may be determined.

Figure 3:
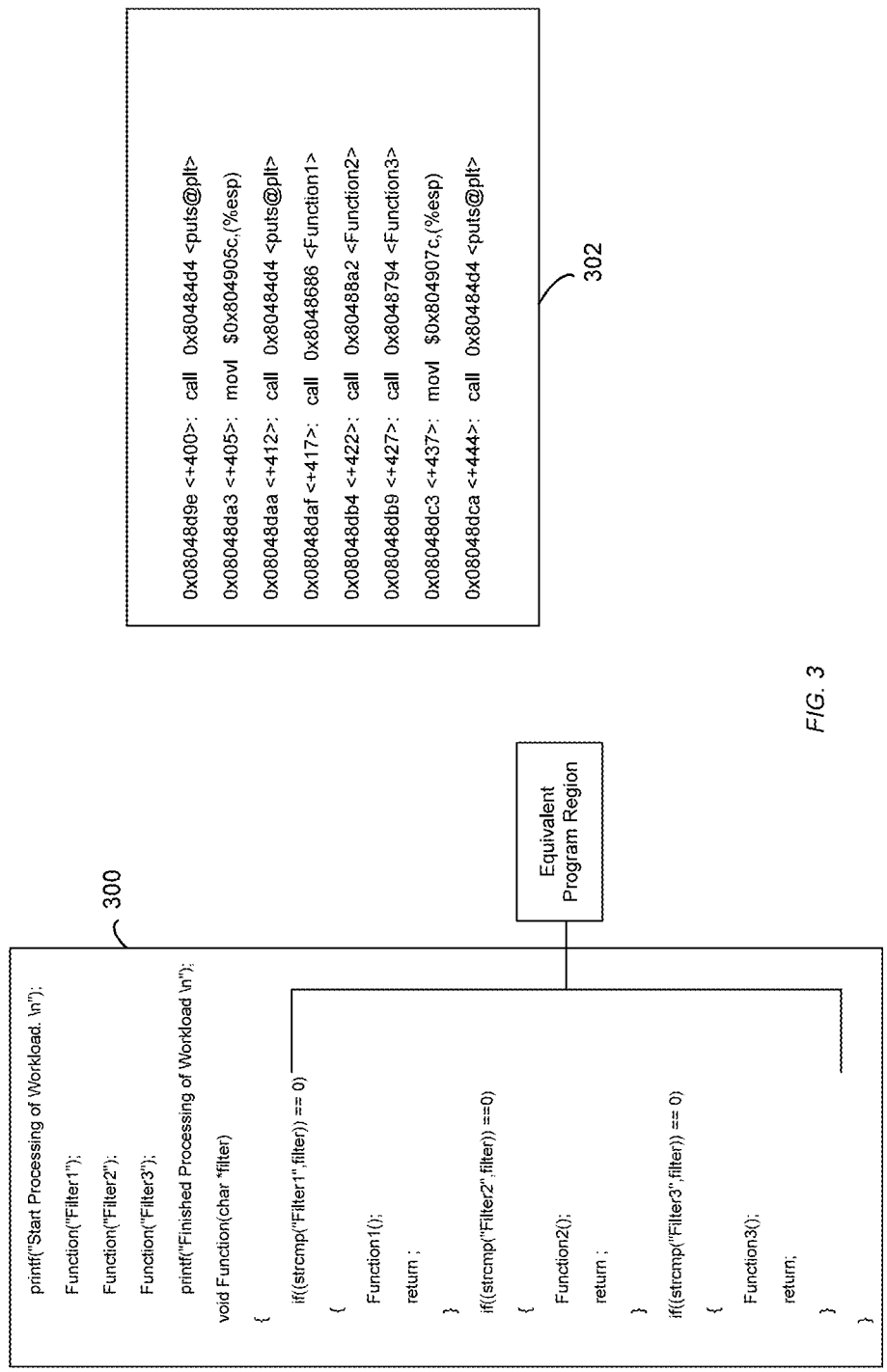
FIG. 3 illustrates a sample program code and a portion of an indicative assembly code of the sample program code of a software application, according to one embodiment.

FIG. 3 illustrates a sample program code and a portion of an indicative assembly code of the sample program code of a software application, according to one embodiment. The sample program code 300 may consist of multiple if statements. The equivalent program region may be identified. The sample program code 300 may be compiled and assembled respectively to generate the assembly code. The assembly code 302 may include the portion of the assembly code of the sample program code. The assembly code of the sample program code may be executed.

FIG. 4 illustrates changing a sequence of a plurality of instructions in the assembly code based on the equivalent program region shown in FIG. 3, according to one embodiment. The sequence of the instructions in the assembly code may be changed from Function 1-Function 2-Function 3 as shown in FIG. 3 to Function 2-Function 1-Function 3. The assembly code of the sample program code may be executed. The performance metrics of the software application may be measured.

FIG. 5 illustrates performance metrics of the software application described in FIG. 3, according to one embodiment. The performance metrics indicates that the sequence of the instructions in the assembly code Function 2-Function 1-Function 3 may take a total execution time of 5 minutes and 23 seconds. The sample program code of FIG. 3 may be executed with the various sequences of the plurality of instructions in the assembly code to compare the performance of the software application.

For example, if a client specifies that the software application shall be used by approximately 5000 users. Out of 5000 users approximately 3000 users shall be updating data in the software application and 2000 users shall be inserting data in the software application. An appropriate sequence of the plurality of instructions in the assembly code may be determined for best performance of the software application based on the various performance metrics.

In case of cloud computing environments, especially Software-as-a-Service, multiple clients may access a software service. Each client shall have a specific workload characteristic and Quality of Service (QoS) requirements. The optimal sequence of the plurality of instructions in the executable code may be determined for each client. Thus, a particular code base for the software application may solve purpose for various clients.

Another example embodiment of the present invention includes analyzing by the one or more computing devices the plurality of program code lines of the software application stored in the one or more computer databases. Further, the one or more equivalent program regions within the plurality of program code lines may be identified. The one or more markers in the identified one or more equivalent program regions may be inserted and stored in the one or more computer databases. Further, the plurality of program code lines may be compiled and assembled respectively to generate the executable code. The executable code may include the plurality of instructions. Further, the performance metrics of the software application may be measured for the specific workload, by manipulating the plurality of instructions based on the one or more equivalent program regions identified by the inserted one or more markers and executing the executable code, while maintaining semantics of the plurality of program code lines same.

Figure 6:
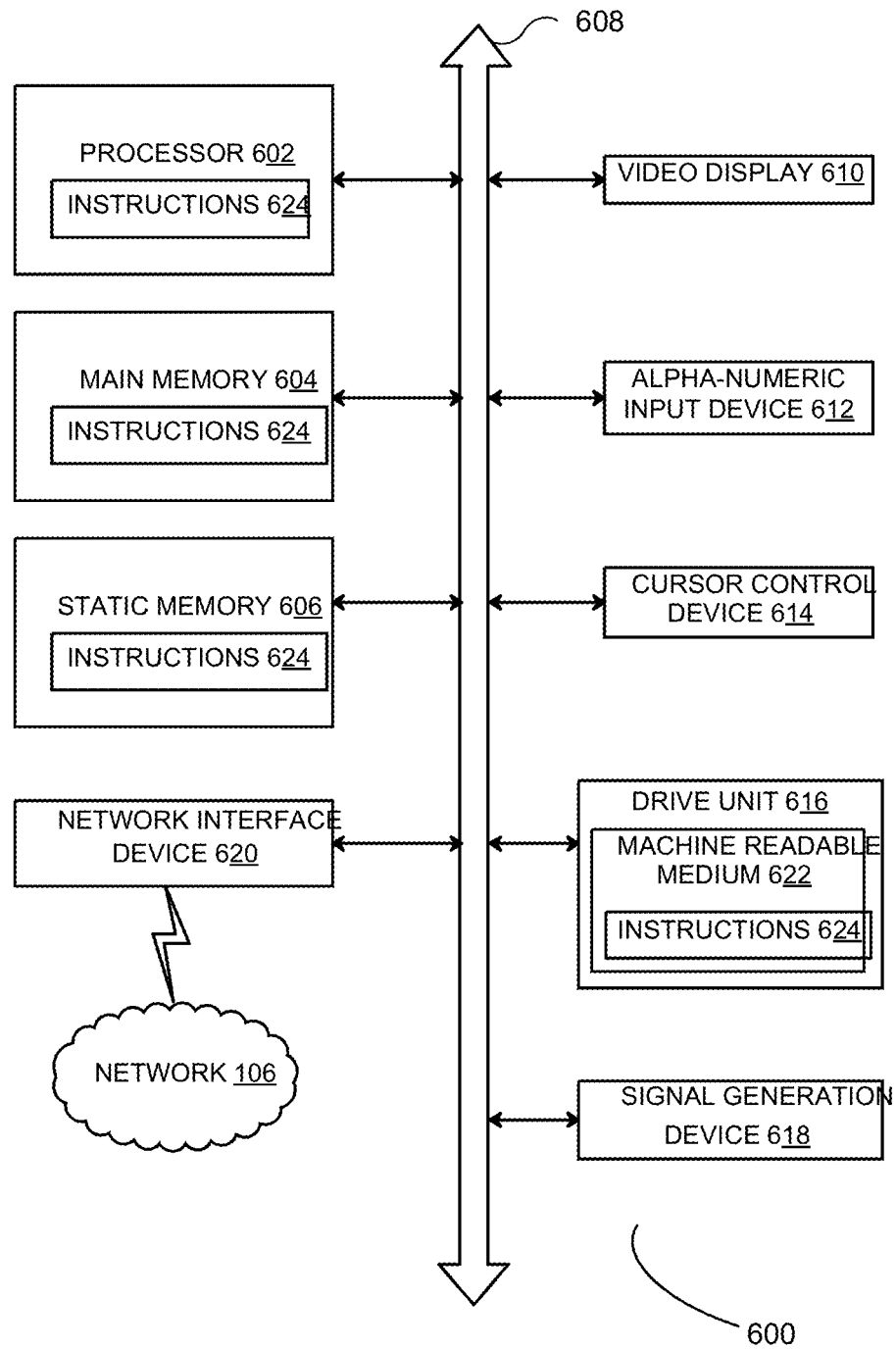
FIG. 6 illustrates a diagrammatic representation of a data processing system capable of processing a set of instructions to perform any one or more of the methodologies herein, according to one embodiment.

FIG. 6 is a diagrammatic representation of a data processing system capable of processing a set of instructions to perform any one or more of the methodologies herein, according to an example embodiment. FIG. 6 shows a diagrammatic representation of machine in the example form of a computer system 600 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal displays (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies and/or functions described herein. The instructions 624 may also reside, completely and/or at least partially, within the main memory 604 and/or within the processor 602 during execution thereof by the computer system 600, the main memory 604 and the processor 602 also constituting machine-readable media.

The instructions 624 may further be transmitted and/or received over a network 106 via the network interface device 620. While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

In addition, it will be appreciated that the various operations, processes, and methods disclosed herein may be embodied in a machine-readable medium and/or a machine accessible medium compatible with a data processing system (e.g., a computer system), and may be performed in any order. The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A method for evaluating performance of a software application, the method comprising:

identifying, by a performance evaluation computing device, a plurality of program regions in a program code data comprising a plurality of instructions, wherein each of the plurality of program regions comprise one or more portions of the plurality of instructions in the program code data that perform an associated one or more functions and each of the one or more portions of the plurality of instructions in the program code data forms one or more sequences;

determining, by the performance evaluation computing device, when one or more markers are inserted in one of the one or more sequences; and in response to the determining that the one or more markers are inserted in the one of the one or more sequences:

changing, by the performance evaluation computing device, a first sequence of the one of the one or more sequences to generate a second sequence associated with the one of the one or more sequences and subjecting the second sequence to a plurality of different workloads, wherein the second sequence is different from the first sequence;

measuring, by the performance evaluation computing device, one or more first performance metrics of the first sequence, before the first sequence is changed to generate the second sequence and one or more second performance metrics of the generated second sequence, wherein the measured one or more first performance metrics comprises a first execution time associated with executing the first sequence and wherein the measured one or more second performance metrics comprises a second execution time associated with executing the second sequence for each of the plurality of different workloads; and determining, by the performance evaluation computing device, the second sequence to be an optimal sequence of the one or more sequences for each of the plurality of different workloads, based on the one or more first performance metrics and the one or more second performance metrics.

2. The method according to claim 1, wherein the plurality of program regions comprise one or more nested control flow statements or loop statements.

3. The method according to claim 1, wherein the plurality of executable programs comprises assembly code or byte code.

4. The method according to claim 1, further comprising:

comparing, by the performance evaluation computing device, the first execution time associated with the first sequence and the second execution time associated with the second sequence; and determining, by the performance evaluation computing device, the second sequence is an optimal sequence based on the comparison.

5. The method of claim 1, further comprising:

inserting, by the performance evaluation computing device, the one or more markers in the identified one or more program regions, wherein a starting point and an end point for the measuring is based on the one or more markers.

6. The method of claim 1, wherein the one or more first performance metrics further comprises software application response time, system resource utilization or the software application throughput.

7. A performance evaluation computing device comprising memory comprising programmed instructions stored thereon and one or more processors configured to execute the stored programmed instructions to:

identify a plurality of program regions in a program code data comprising a plurality of instructions, wherein each of the plurality of program regions comprise one or more portions of the plurality of instructions in the program code data that perform an associated one or more functions and each of the one or more portions of the plurality of instructions in the program code data forms one or more sequences;

determine when one or more markers are inserted in one of the one or more sequences; and in response to the determining that the one or more markers are inserted in the one of the one or more sequences:

change, by the performance evaluation computing device, a first sequence of the one of the one or more sequences to generate a second sequence associated with the one of the one or more sequences and subjecting the second sequence to a plurality of different workloads, wherein the second sequence is different from the first sequence;

measure one or more first performance metrics of the first sequence, before the first sequence is changed to generate the second sequence and one or more second performance metrics of the generated second sequence, wherein the measured one or more first performance metrics comprises a first execution time associated with executing the first sequence and wherein the measured one or more second performance metrics comprises a second execution time associated with executing the second sequence for each of the plurality of different workloads; and determine the second sequence to be an optimal sequence of the one or more sequences for each of the plurality of different workloads, based on the one or more first performance metrics and the one or more second performance metrics.

8. The device according to claim 7, wherein the plurality of program regions comprises one or more nested control flow statements or loop statements.

9. The device according to claim 7, wherein the plurality of executable programs comprises assembly code or byte code.

10. The device according to claim 7, wherein the processor coupled to the memory is further configured to execute additional programmed instructions comprising and stored in the memory to:

compare the first execution time associated with the first sequence and the second execution time associated with the second sequence; and determine the second sequence is an optimal sequence based on the comparison.

11. The device of claim 7, wherein the processor coupled to the memory is further configured to execute additional programmed instructions comprising and stored in the memory to:

insert the one or more markers in the identified plurality of program regions, wherein a starting point and an end point for the measuring is based on the one or more markers.

12. The device of claim 7, wherein the one or more first performance metrics further comprises software application response time, system resource utilization or the software application throughput.

13. A non-transitory computer readable medium having stored thereon instructions for evaluating performance of a software application comprising executable code which when executed by a processor, causes the processor to perform steps comprising:

identifying a plurality of program regions in a program code data of a software application comprising a plurality of instructions, wherein each of the plurality of program regions comprise a one or more portions of the plurality of instructions in the program code data that perform an associated one or more functions and each of the one or more portions of the plurality of instructions in the program code data forms one or more sequences;

determining when one or more markers are inserted in one of the one or more sequences; and in response to the determining that the one or more markers are inserted in the one of the one or more sequences:

changing a first sequence of the one of the one or more sequences to generate a second sequence associated with the one of the one or more sequences and subjecting the second sequence to a plurality of different workloads, wherein the second sequence is different from the first sequence;

measuring one or more first performance metrics of the first sequence, before the first sequence is changed to generate the second sequence and one or more second performance metrics of the generated second sequence, wherein the measured one or more first performance metrics comprises a first execution time associated with executing the first sequence and wherein the measured one or more second performance metrics comprises a second execution time associated with executing the second sequence for each of the plurality of different workloads; and determining the second sequence to be an optimal sequence of the one or more sequences for each of the plurality of different workloads, based on the one or more first performance metrics and the one or more second performance metrics.

14. The medium according to claim 13, wherein the plurality of program regions comprises one or more nested control flow statements or loop statements.

15. The medium according to claim 13, wherein the plurality of executable programs comprises assembly code or byte code.

16. The medium according to claim 13, further having stored thereon at least one additional instruction that when executed by the processor cause the processor to perform at least one additional step comprising comparing the first execution time associated with the first sequence and the second execution time associated with the second sequence; and determining the second sequence is an optimal sequence based on the comparison.

17. The medium of claim 13, further having stored thereon at least one additional instruction that when executed by the processor cause the processor to perform at least one additional step comprising:

inserting the one or more markers in the identified plurality of program regions, wherein a starting point and an end point for the measuring is based on the one or more markers.

18. The medium of claim 13, wherein the one or more first performance metrics further comprises software application response time, system resource utilization or the software application throughput.

* * * * *